Feb. 2, 1954

F. W. FRINK 2,668,238

WIDE-BAND PHASE SHIFTING MEANS

Filed Aug. 20, 1946

INVENTOR
FREDERICK W. FRINK
BY
Mason, Nolte, Crews + Berry
ATTORNEYS

Feb. 2, 1954

F. W. FRINK 2,668,238

WIDE-BAND PHASE SHIFTING MEANS

Filed Aug. 20, 1946

INVENTOR
FREDERICK W. FRINK
BY
ATTORNEYS

Feb. 2, 1954

F. W. FRINK 2,668,238

WIDE-BAND PHASE SHIFTING MEANS

Filed Aug. 20, 1946

INVENTOR
FREDERICK W. FRINK
BY
*Moser, Nolte, Cravos + Berry*
ATTORNEYS

Feb. 2, 1954

F. W. FRINK 2,668,238

WIDE-BAND PHASE SHIFTING MEANS

Filed Aug. 20, 1946

INVENTOR
FREDERICK W. FRINK
BY
Moses, Nolte, Cross & Berry
ATTORNEYS

Feb. 2, 1954   F. W. FRINK   2,668,238
WIDE-BAND PHASE SHIFTING MEANS
Filed Aug. 20, 1946   8 Sheets-Sheet 5

INVENTOR
FREDERICK W. FRINK
BY
*Morse, Nolte, Crews & Berry*
ATTORNEYS

Fig. 15.

Patented Feb. 2, 1954

2,668,238

UNITED STATES PATENT OFFICE 2,668,238

WIDE-BAND PHASE SHIFTING MEANS

Frederick W. Frink, East Orange, N. J.

Application August 20, 1946, Serial No. 691,852

33 Claims. (Cl. 250—27)

My invention relates to phase shifters in which the amount of phase shift is substantially independent of frequency. More particularly, it relates to such phase shifters in which the original relative voltage magnitudes are maintained for practical purposes throughout a substantial frequency range at the same time producing a phase shift of some constant predetermined angle such as 90 degrees.

An object of my invention is to apply such an improved phase shifter to a system for producing single side band modulation of a carrier frequency oscillator.

A further object of my invention is to provide an improved phase shifter having greater constancy of phase shift and output voltage in the presence of varying frequency than has been heretofore known.

From another aspect, my invention includes the application of stabilized negative impedances to produce a phase shifter of the type described.

Referring to the drawings.

Figure 1:
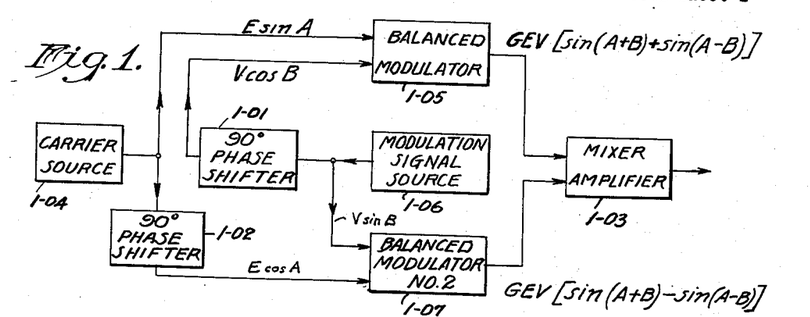
Fig. 1 is a diagrammatic representation of a single side band modulator employing a 90° phase shifter of a type contemplated by the invention.

Referring to Fig. 1, a method of producing single-sideband modulation from a source of carrier frequencies is illustrated.

This method of side-band suppression is described in the November 1945 issue of Electronics in an article by M. A. Honnell at page 166. This method of side-band suppression avoids the necessity for sharply tuned filters. Two separate balanced modulators are used, and the carrier voltages applied to these two modulators are 90 degrees out of phase with each other; also, the audio-frequqency modulating voltages applied to the two modulators are 90 degrees out of phase with each other.

By using the equations for amplitude-modulated signals, Honnell shows that the outputs of the balanced modulators are of the form $$G \sin (2\pi f_c t + 2\pi f_s t) + G \sin (2\pi f_c t - 2\pi f_s t)$$

and $$G \sin (2\pi f_c t + 2\pi f_s t) - G \sin (2\pi f_c t - 2\pi f_s t)$$

where $G$ is the modulator conversion gain,
$f_c$ is the carrier frequency,
$f_s$ is the frequency of the modulating signal.

When these two outputs are added together in the mixer amplifier the resultant is the upper sideband, and if they are subtracted the resultant is the lower sideband.

The degree of effectiveness of side band suppression is largely dependent on the ability of the 90° phase shifters to produce an accurate and constant 90° shift without changing the relative amplitudes of the voltages. These are the phase shifters 1–01 and 1–02 shown in Fig. 1. The mixer-amplifier 1–03 is a linear amplifier. Energy from the carrier source 1–04 having a voltage which may be expressed as $E \sin A$ is applied to the input of balanced modulator 1–05. Energy from the modulating signal source 1–06 is first passed through 90° phase shifter 1–01. The original expression for the voltage of the modulating signal source 1–06 may be $V \sin B$, where V represents maximum amplitude and B represents the instantaneous phase angle. The effect of passing through the 90° phase shifter 1-01 changes this expression to $V \cos B$ assuming that there is no change in amplitude. The carrier voltage $E \sin A$ and the shifted modulating voltage $V \cos B$ are applied to balanced modulator 1-05 yielding a resultant voltage which, by applying the conventional trigonometric formulas, may be expressed $$GEV[\sin (A+B) + \sin (A-B)]$$

G representing the modulator conversion gain.

Another portion of energy from carrier source 1-04 is taken through the 90° phase shifter 1-02 where its original expression $E \sin A$ is changed to $E \cos A$. The modulating signal voltage of the form $V \sin B$ is taken directly from the signal source 1-06 and applied simultaneously with the shifted carrier voltage $E \cos A$ to the input of balanced modulator 1-07. The output of the modulator may be similarly expressed $$GEV[\sin (A+B) - \sin (A-B)]$$

In the linear mixer amplifier 1-03 these two voltages are combined additively giving an output which may be expressed as $G \sin (A+B)$. This expression represents the upper sideband. The lower side-band, $G \sin (A-B)$ was algebraically eliminated in the process of addition. Obviously, reversal of the polarity of either of two input connections to mixer 1-03 will produce subtraction leaving only the lower sideband and balancing out the upper sideband.

It is apparent from the foregoing that the outputs of the two phase shifters 1-01 and 1-02 must remain substantially constant both in relative magnitudes and in shifted phase angle with respect to their inputs throughout the range of frequencies which it is proposed to utilize during transmission. Of course, the phase shifter 1-02, being connected in the circuit of carrier source 1-04 operates at substantially constant frequency and constant voltage and thus requires no unusual characteristics. In the case of shifter 1-01, however, a much more difficult problem is presented for which the invention presents a workable and practical solution.

In practicing several embodiments of the invention, negative impedances are used and before proceeding with a more detailed description of the specific phase shifters to be employed, the method of obtaining such negative impedances will be discussed.

In the July 1945 issue of Electronics, page 140, E. L. Ginzton shows how a negative inductance or negative capacitance can be obtained by means of a two stage amplifier having either an inductor or a capacitor respectively, connected from one of the amplifier input terminals to one of its output terminals. A negative inductance is a reactive circuit element which resembles an ordinary inductance in the sense that its reactance increases directly in proportion to the frequency but it differs from the ordinary inductance in that its phase angle is opposite to that of a positive inductance, the vectorial equivalent of multiplication by $(-1)$ and thus is $-90°$ instead of $+90°$. Thus the reactance of such a negative inductance is therefore $-j\omega L$ instead of $+j\omega L$ as in the case of an ordinary or positive inductance.

Similarly, the reactance of the negative capacitance is $+j/\omega C$ instead of $-j/\omega C$ as in the case of an ordinary capacitance and moreover the current in the negative capacitance lags the applied voltage by 90° instead of leading it. The absolute magnitudes of reactance are the same for either positive or negative inductances or capacitances.

Figure 2:
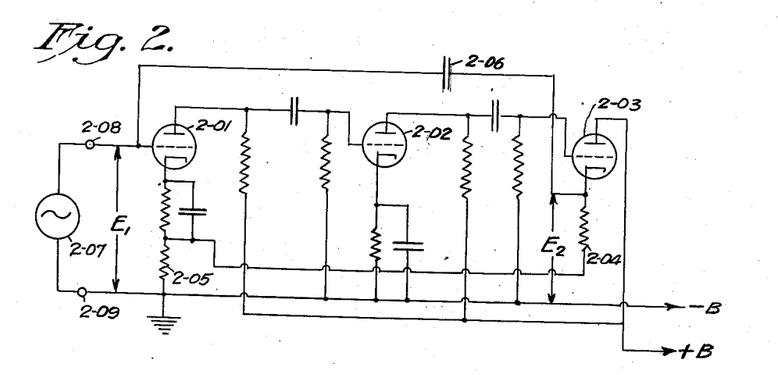
Fig. 2 is a circuit diagram of a network including an amplifier which may be used in practicing the invention.

A circuit for obtaining negative capacitative reactance is shown in Fig. 2. The triodes 2-01 and 2-02 constitute a two stage voltage amplifier and triode 2-03 is connected as a cathode follower which serves to reduce the output impedance. The circuit constants are so chosen that within the frequency range of 200 to 3,000 cycles, for example, the over-all phase shift will be sufficiently small to be negligible. The magnitude of phase shift produced by the amplifier is further reduced by the use of an inverse feed-back circuit which may be traced thorugh resistor 2-04 and resistor 2-05 to ground, resistor 2-05 thus forming a common circuit element in the cathode return circuits of triodes 2-01 and 2-03. This inverse feed-back connection also serves to stabilize the overall gain of the amplifier and remove or reduce the effects of variations in tube characteristics. Assuming that the amount of phase shift has been reduced to a negligible value, the A. C. voltage $E_2$ between the cathode of tube 2-03 and ground will be in phase (relative to ground) with the A. C. voltage $E_1$ applied to the grid of input tube 2-01. The current I which flows in the capacitor 2-06 as a result of the difference between these two voltages leads the voltage $E_2$ by 90° and hence lags the input voltage $E_1$ by the same amount, since $E_1$ is opposed in direction to $E_2$. Because this lagging current increases in magnitude in direct proportion to the frequency of the voltage E, the overall effect presented to the generator 2-07 at terminals 2-08 and 2-09 is that of a negative capacitance. In other words, the reactance presented by terminals 2-08 and 2-09 is inversely proportional to the frequency of the applied voltage. However, unlike the usual or positive capacitance its phase angle is reversed and a lagging current flows instead of a leading current.

In ordinary usage, the term "negative reactance" is generally understood to refer to a conventional reactance of a capacitative character whose magnitude decreases with increasing frequency and whose phase angle is $$-\frac{\pi}{2}$$

as indicated by the familiar expression $$X = -j/\omega C$$

In a negative capacitative reactance, the reactance is capacitative in character, inasmuch as its magnitude decreases with increasing frequency, but its phase angle is reversed to $$+\frac{\pi}{2}$$

as indicated by the expression $X = +j/\omega C$. A similar situation prevails with respect to inductive reactance, the conventional reactance being $+j\omega L$ and therefore being referred to as "positive."

In order to avoid possible confusion between conventional reactances and the special negative reactances, described above, and particularly where it is immaterial whether the reactance is inductive or capacitative in character, these special reactances which are obtained by the use of amplification as shown in Figure 2, will be referred to as "reversed reactances," since their characteristics are otherwise the same as those of their conventional and well known counterparts, except that their phase angles are reversed. Similarly, the reactance of the simple capacitor or inductor will be referred to as "conventional reactance," in order to emphasize the distinction between one type of reactance and the other. The expression "reversed impedance" will be used to designate an impedance comprising a reversed reactance.

In accordance with Ginzton's analysis the quantitative value of the negative capacitance may be evaluated from the equation $-C_n$ is equal to $C_1(1-A_1)$ where $C_1$ is the capacitance of capacitor 2-06, $-C_n$ is the effective negative capacitance presented to generator 2-07 at terminals 2-08 and 2-09, and $A_1$ is the net overall gain of the amplifier including the effect of inverse feedback through the common cathode resistor 2-05. This expression does not take into consideration the effect which the resistor 2-04 might have on the magitude and prase of the current flowing in capacitor 2-06, but the circuit constants are so selected that the effect of resistance 2-04 is negligible as compared with the reactance of capacitor 2-06.

It is apparent that if an inductor were substituted for capacitor 2-06 the effective input impedance of the network would be a negative inductive reactance instead of a negative capacitive reactance.

Figure 3:
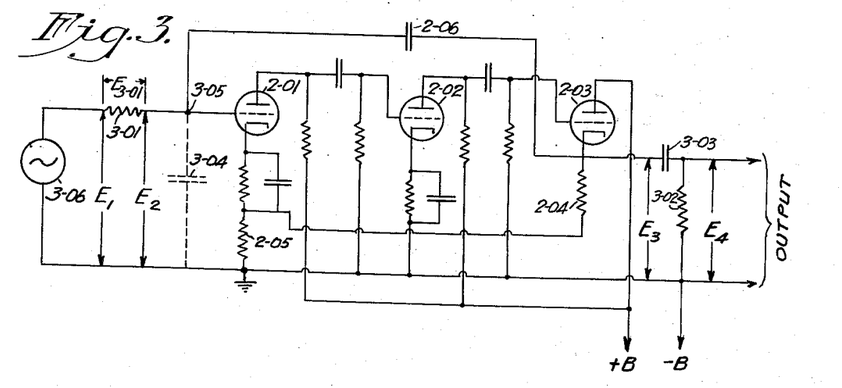
Fig. 3 is a circuit diagram illustrating a method of using negative capacitance to obtain a 90° phase shift.

Referring to Fig. 3, a circuit is illustrated in which a reversed impedance network as shown in Fig. 2 is utilized to obtain a 90° phase shift within the frequency range from 200 to 3,000 cycles, for example. Fig. 3 is the same as Fig. 2 except that resistors 3-01 and 3-02 and capacitor 3-03 have been added. As previously explained in connection with Fig. 2, capacitor 2-06 appears at the input circuit as a negative capacitor connected from the grid of triode 2-01 to ground and is the equivalent, from a circuit performance standpoint, of a negative capacitance represented by the dotted lines 3-04. For the purposes of computation we may, therefore, assume that we have a negative capacitance shown dotted 3-04 connected between the terminal 3-05 and ground.

At the input circuit of the phase shifter, the resistor 3-01 is so selected that at a frequency of 750 cycles its resistance is equal in magnitude to the reactance of the equivalent negative capacitance 3-04. A frequency of 750 cycles has been selected to facilitate computation and because it is the approximate geometric mean between the frequencies of 200 cycles per sec. and 3,000 cycles per sec., these frequencies being the upper and lower limits of the frequencies arbitrarily selected for the particular phase shifters used as examples. The values of capacitor 3-03 and resistor 3-02, which resistor is very much larger than the cathode resistor 2-04, have been chosen so that at the mean frequency of 750 cycles the net output voltage $E_4$ is 45° out of phase with the total output voltage $E_3$ appearing between the cathode of triode 2-03 and ground.

The other circuit constants have been so selected that the only phase shifts which may not be neglected are those produced by resistor 3-01 and equivalent negative capacitor 3-04 at the input of the phase shifter and the output capacitor 3-03 and output resistor 3-02.

Figure 4A:
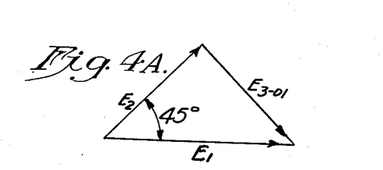
Figs. 4a, 4b, 5a and 5b are vector diagrams illustrating certain of the voltage relationships in Fig. 3.
Figure 4B:
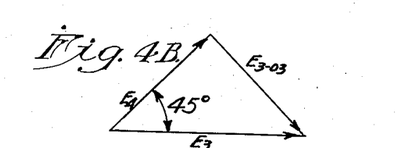

Referring to Figs. 4a and 4b, the voltage of source 3-06, $E_1$ is equal to the vector sum of the voltage $E_2$ across the input terminal 3-05 to ground and the voltage drop $E_{3-01}$ across resistor 3-01 at the mean frequency of 750 cycles per sec. The voltage across resistor 3-01 lags the input voltage $E_1$ because of the fact that the current for the equivalent negaticve capacitance 3-04 is a lagging current. The voltage $E_2$ leads voltage $E_1$ since it is the voltage across the negative capacitance and must, therefore, lead the current.

Fig. 4b shows the usual case of a resistor in series with an ordinary capacitor.

Figure 5A:
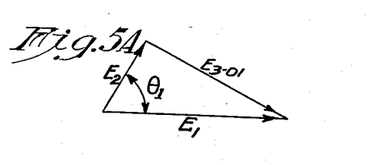
Figure 5B:
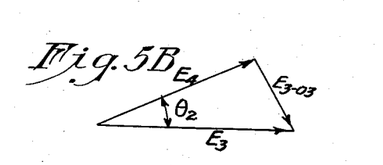

Now assume that the frequency changes to some new value, $f$, which differs from the mean frequency of 750 cycles. The new vector relations are shown in Figs. 5a and 5b. The voltage ratio at the input $E_{3-01}/E_2$ is now equal to $f/750$ instead of to unity, and at the output the new ratio $E_{3-03}/E_4$ is equal to $750/f$ instead of unity. At the input, the phase angle $$\theta_1 = \arctan(E_{3-01}/E_2) = \arctan(f/750)$$

Now, at the input, $$\theta_1 = \arctan\frac{E_{3-01}}{E_2} = \arctan\frac{f}{750} \quad (1)$$

and at the output, $$\theta_2 = \arctan\frac{E_{3-03}}{E_4} = \arctan\frac{750}{f} \quad (2)$$

but $$\arctan\frac{750}{f} = 90° - \arctan\frac{f}{750}$$

therefore, $\theta_1 + \theta_2 = 90°$ regardless of the value of frequency $f$.

Hence the signal voltage in passing through the network of Fig. 3 from generator 3-06 to output resistor 3-02 is first shifted in phase by an angle $\theta_1$ produced by the combined action of resistor 3-01 and the equivalent input capacitance 3-04 and then at the output it is shifted through a complementary angle $\theta_2$ by the combined action of capacitor 3-03 and resistor 3-02 and the total phase shift will be 90° regardless of the input frequency.

The network of Fig. 3, as has been shown, will provide the required constant 90° phase shift but it is necessary to provide additional circuit elements before the proper frequency-amplitude relations will be maintained.

Considering the network of Fig. 3, let $A_1$=ratio of $E_3/E_2$, which may be considered constant, because resistors 2-04 and 2-05 are very small compared with resistor 3-02. Then, $$\text{Overall gain} = \frac{E_4}{E_1} = \frac{E_2}{E_1} A_1 \frac{E_4}{E_3} = A_1 \cos\theta_1 \cos\theta_2 =$$

$$A_1 \left(\frac{1}{\sqrt{1+\tan^2\theta_1}}\right)\left(\frac{1}{\sqrt{1+\tan^2\theta_2}}\right)$$

but according to Equations 1 and 2, $$\tan\theta_1 = \frac{f}{750}$$

$$\tan\theta_2 = \frac{750}{f}$$

Then, $$\frac{E_4}{E_1} = \frac{A_1}{\sqrt{1+\left(\frac{f}{750}\right)^2}\sqrt{1+\left(\frac{750}{f}\right)^2}} =$$

$$\frac{\sqrt{\left(\frac{f}{750}\right)^2}}{\sqrt{\left(\frac{f}{750}\right)^2}} \cdot \frac{A_1}{\sqrt{1+\left(\frac{f}{750}\right)^2}\sqrt{1+\left(\frac{750}{f}\right)^2}} =$$

$$\frac{A_1\left(\frac{f}{750}\right)}{\sqrt{\left(\frac{f}{750}\right)^2\left[1+\left(\frac{f}{750}\right)^2\right]\left[1+\left(\frac{750}{f}\right)^2\right]}}=$$

$$\frac{A_1\left(\frac{f}{750}\right)}{\sqrt{\left(\frac{f}{750}\right)^4+2\left(\frac{f}{750}\right)^2+1}}=\frac{A_1\left(\frac{f}{750}\right)}{1+\left(\frac{f}{750}\right)^2} \quad (3)$$

Figure 6:
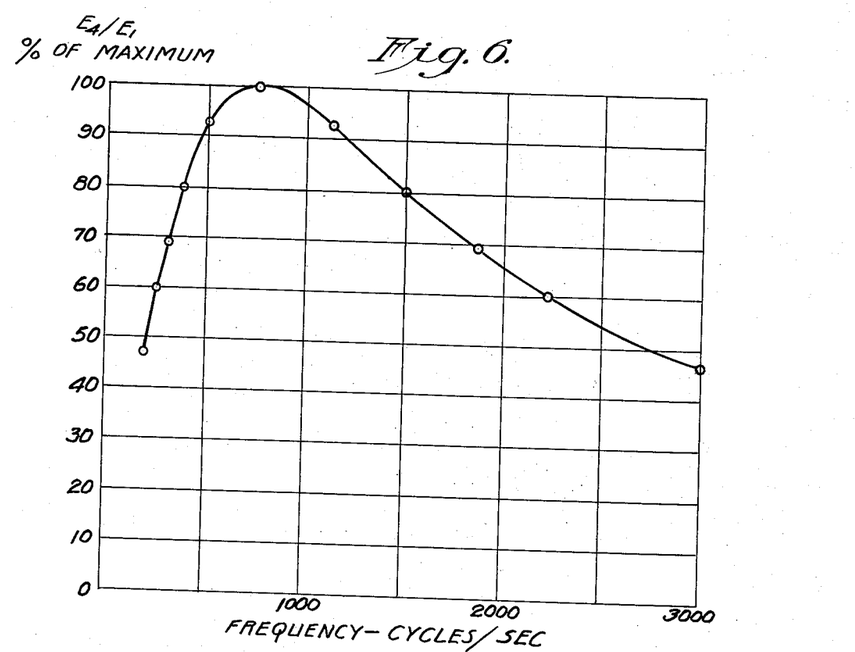
Fig. 6 is a graph illustrating the voltage frequency characteristics of an amplifier network of Fig. 3 which produces 90° phase shift.

Values of $E_4/E_1$ corresponding to various values of frequency $f$ have been calculated by means of Equation 3, and have been plotted in Fig. 6. As will be noted from an examination of Fig. 6, a suitable equalizing network will furnish the necessary amplitude correction provided, however, that this can be done without altering pre-existing phase relationships.

Figure 7:
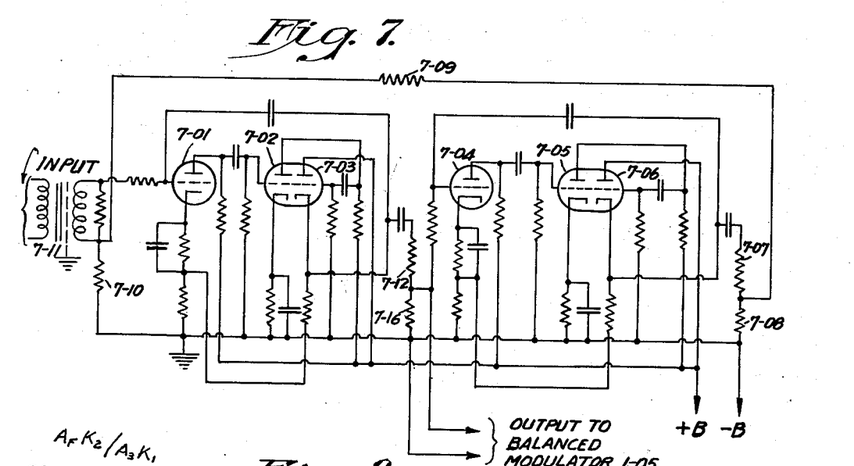
Fig. 7 is a circuit diagram of a compensated network for producing 90° phase shift.

Several different networks were devised for equalizing the gain over the required frequency range without impairing the accuracy of the 90° phase shift obtained. The simplest of these networks, and one which gives good enough results for some applications, is shown in Fig. 7, which includes both the phase shifter and the amplitude compensating network. Triodes 7-01, 7-02 and 7-03, and their associated resistors and capacitors, comprise a phase shifter which is the same as that shown in Fig. 3 except that triodes 7-02 and 7-03 are the two triode sections of a twin triode, instead of being completely separate tubes as in Fig. 3. The voltage supplied to Balanced Modulator 1-05 of Fig. 1 is obtained across resistor 7-16 of Fig. 7.

For amplitude compensation, a second 90° phase shifter, employing triodes 7-04, 7-05 and 7-06, has been added, and is connected in cascade with the first phase shifter; also, the output voltage of this second phase shifter is connected through resistor 7-09 to resistor 7-10, which is in the input circuit of the first phase shifter. Since the overall phase shift from the secondary winding of transformer 7-11 to resistor 7-08 is 180 degrees, the feedback produced by resistors 7-09 and 7-10 is an inverse feedback. It opposes the voltage of transformer 7-11, but it does not change the phase of any of the voltages in the network.

Let $A_1$=gain from the grid of 7-01 to the cathode of 7-03, $A_2$=gain from the grid of 7-04 to the cathode of 7-06. Then, with reference to Equation 3 above, it is evident that when resistor 7-09 is disconnected, the overall gain of the entire network from transformer 7-11 to resistor 7-08 is $$A_0=\frac{A_1\left(\frac{f}{750}\right)}{1+\left(\frac{f}{750}\right)^2}\cdot\frac{A_2\left(\frac{f}{750}\right)}{1+\left(\frac{f}{750}\right)^2}\left(\frac{R_{7-16}}{R_{7-12}+R_{7-16}}\right)\left(\frac{R_{7-08}}{R_{7-07}+R_{7-08}}\right)=\frac{K_1 n^2}{(1+n^2)^2} \quad (4)$$

where $$K_1=A_1 A_2\left(\frac{R_{7-16}}{R_{7-12}+R_{7-16}}\right)\left(\frac{R_{7-08}}{R_{7-07}+R_{7-08}}\right)$$

and $$n=\frac{f}{750}$$

where, referring to Fig. 7, $R_{7-16}$ is the resistance value of resistor 7-16 and where other subscripts for R denote the resistance values of correspondingly designated resistors.

To determine the effect introduced by establishing the feedback circuit through resistor 7-09, we must introduce a new factor, $$\beta=R_{7-10}/(R_{7-10}+R_{7-09})$$

which may be called the feedback factor. The overall gain of the network from transformer 7-11 to resistor 7-08 is now $$A_F=\frac{A_0}{1+\beta A_0}=\frac{\frac{K_1 n^2}{(1+n^2)^2}}{1+\beta\left[\frac{K_1 n^2}{(1+n^2)^2}\right]} \quad (5)$$

where $A_F$ is the overall gain including the effect of the feedback circuit.

The next step in our analysis is to determine how the amplitude of the output voltage obtained across resistor 7-16 varies with the frequency. By referring to Equation 3, we can see that the voltage gain represented by $A_3$ from resistor 7-16 to resistor 7-08 is:

$$A_3=A_2\left(\frac{n}{1+n^2}\right)\left(\frac{R_{7-08}}{R_{7-07}+R_{7-08}}\right)=\frac{K_2 n}{1+n^2} \quad (6)$$

where $$K_2=A_2\left(\frac{R_{7-08}}{R_{7-07}+R_{7-08}}\right)$$

To find the gain from transformer 7-11 to resistor 7-16 we must divide Equation 5 by Equation 6, thus obtaining $$\frac{A_F}{A_3}=\frac{\frac{K_1}{K_2}\cdot\frac{n}{(1+n^2)}}{1+\beta\left[\frac{K_1 n^2}{(1+n^2)^2}\right]} \quad (7)$$

Let us suppose that the feedback factor $\beta$ is adjusted, by adjusting the resistance values of resistors 7-09 and 7-10, so that $\beta K_1=7.8$. Then, Equation 7 becomes $$\frac{A_F}{A_3}=\frac{\frac{K_1}{K_2}\left(\frac{n}{1+n^2}\right)}{1+7.8\left(\frac{n}{1+n^2}\right)^2} \quad (8)$$

Figure 8:
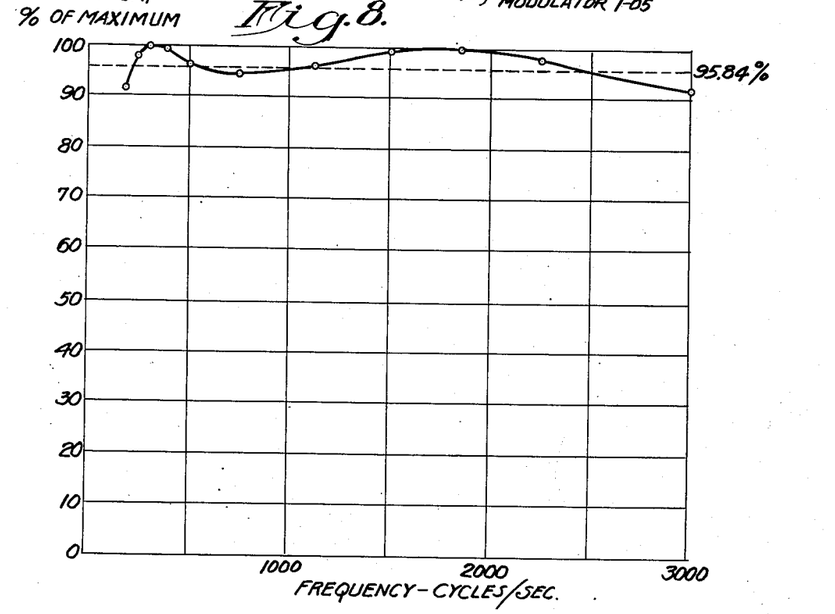
Fig. 8 is a graph showing the voltage-frequency characteristics of the network shown in Fig. 7.

The values of $$\frac{A_F K_2}{A_3 K_1}$$

corresponding to various frequencies have been calculated, by means of Equation 8, and plotted in Figure 8, where they are expressed as percentages of the maximum value. The calculated values are also given in the third and fourth columns of Table I. Fig. 8 evidently represents a large improvement over Fig. 6.

The curve of Fig. 8 represents the modulating voltage applied to balanced modulator 1-05 of Fig. 1, as a function of frequency, for constant voltage at the output of the modulating signal source. Under the same conditions, the modulating voltage applied to balanced modulator 1-07 does not vary with frequency. Let us assume that the circuits are adjusted so that the modulating voltage applied to balanced modulator 1-07 is 95.84% of the maximum applied to balanced modulator 1-05 as shown by the dotted horizontal line in Fig. 8, which represents the average value throughout the 200 to 3,000 cycle frequency range. The ratio of the desired sideband voltage to the rejected sideband voltage can now be calculated for any given modulating frequency by adding 95.84% to the figure given in the fourth column of Table I, and then dividing by the difference between 95.84 and the same figure. For example, if the modulating frequency is 250 cycles/sec. the ratio of the desired sideband voltage to the rejected sideband voltage is $$\frac{98.38+95.84}{98.38-95.84}=76.46$$

The ratios for the other modulating frequencies have been calculated, and are recorded in the fifth column of Table I. The corresponding decibel values have been recorded in the sixth column.

Table I

| Frequency, Cycles/Sec. | $n$ | $A_fK_2/A_3K_1$ | | Relative sideband Amplitude | |
|---|---|---|---|---|---|
| | | Value | Percent of Maximum Value | Numerical Ratio | Db |
| 187.5 | 1/4 | 0.1641 | 91.68 | 45.08 | 33.1 |
| 250 | 1/3 | 0.1761 | 98.38 | 76.46 | 37.7 |
| 300 | 2/5 | 0.1790 | 100.00 | 47.08 | 33.5 |
| 375 | 1/2 | 0.1783 | 99.61 | 51.84 | 34.3 |
| 500 | 2/3 | 0.1732 | 96.76 | 209.35 | 46.4 |
| 750 | 1 | 0.1695 | 94.69 | 165.68 | 44.4 |
| 1,125 | 3/2 | 0.1732 | 96.76 | 209.35 | 46.4 |
| 1,500 | 2 | 0.1783 | 99.61 | 51.84 | 34.3 |
| 1,875 | 5/2 | 0.1790 | 100.00 | 47.08 | 33.5 |
| 2,250 | 3 | 0.1761 | 98.38 | 76.46 | 37.7 |
| 3,000 | 4 | 0.1641 | 91.68 | 45.08 | 33.1 |

Figure 9:
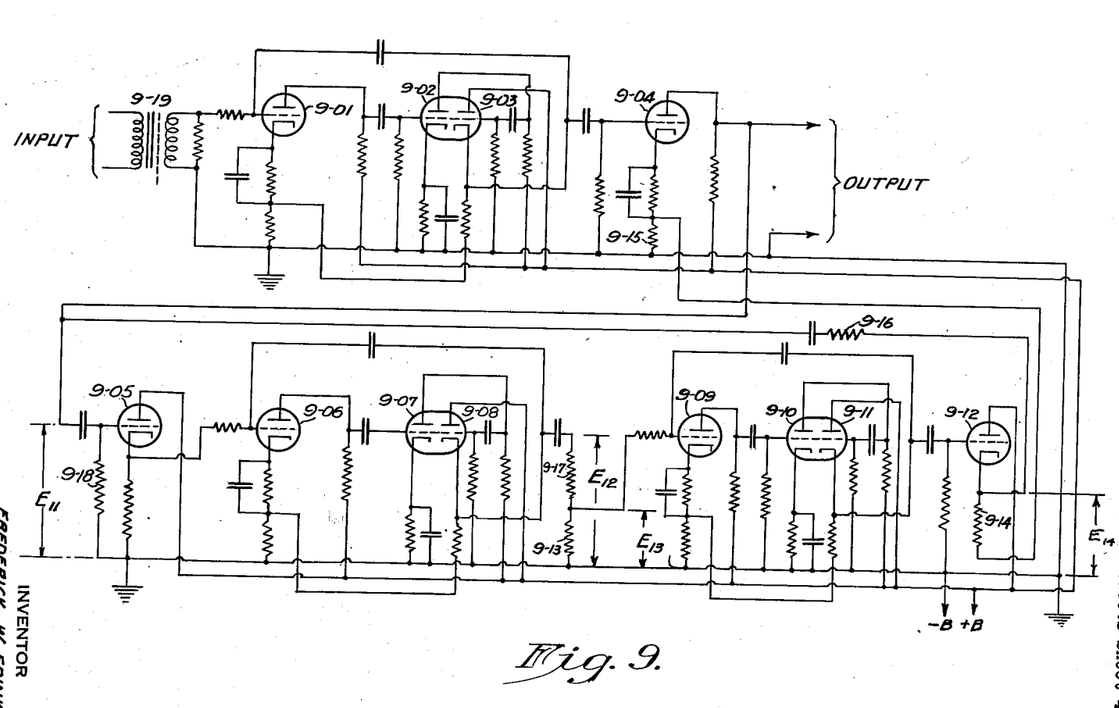
Fig. 9 is a circuit diagram of a more elaborate network which produces a greater degree of constancy in output voltage and phase shift than the network of Fig. 7.

Figure 9 shows a more elaborate network which provides for a much greater rejection of the undesired sideband than the network shown in Fig. 7. In Fig. 9, triodes 9-01, 9-02, and 9-03, with their associated resistors and capacitors, constitute a 90-degree phase-shifting network similar to that shown in Fig. 3. This phase-shifting network is followed by a triode amplifier 9-04, and the output voltage for application to the balanced modulator 1-05 of Fig. 1 is obtained from the plate circuit of tube 9-04.

Amplifier 9-04 is designed to have inverse feedback from its plate circuit to its cathode circuit, but the feedback voltage has to travel through triodes 9-05, 9-06, 9-07, 9-08, 9-09, 9-10, 9-11, and 9-12, in passing from the plate circuit of triode 9-04 to the cathode circuit resistor 9-15. In passing through these various triodes and their associated circuits, the feedback voltage undergoes an amplification, the magnitude of which is a function of frequency. The gain of amplifier 9-04 is governed by this feedback voltage in such a manner as to compensate for the frequency discrimination occurring in the phase shifter composed of triodes 9-01, 9-02, and 9-03. Since the variation of amplitude in the output of this phase shifter is as shown by the curve of Fig. 6, amplifier 9-04 must have a characteristic in which the ordinates are proportional to the reciprocals of those plotted in Fig. 6.

In the feedback network associated with amplifier 9-05 there are two complete 90-degree phase shifters in cascade. One of these phase shifters employs triodes 9-06, 9-07, and 9-08 and the other employs triodes 9-09, 9-10, and 9-11. The feedback network also includes input and output cathode followers, 9-05 and 9-12 respectviely, which are used for impedance transformation. Since each of these phase shifters is similar to that shown in Fig. 3, the gain of each is represented by an equation similar to Equation 3; i. e., $$\frac{E_{12}}{E_{11}}=\frac{K_{11}n}{1+n^2}$$

and $$\frac{E_{14}}{E_{13}}=\frac{K_{12}n}{1+n^2}$$

where $$n=\frac{f}{750}$$

and $K_{11}$ and $K_{12}$ are constants.

Then, the overall gain, with feedback resistor 9-16 disconnected, is $$\frac{E_{14}}{E_{11}}=\frac{E_{12}}{E_{11}}\left(\frac{R_{9-13}}{R_{9-13}+R_{9-17}}\right)\frac{E_{14}}{E_{13}}=$$

$$\frac{K_{11}n}{(1+n^2)}\left(\frac{R_{9-13}}{R_{9-13}+R_{9-17}}\right)\left(\frac{K_{12}}{1+n^2}\right)=\frac{K_{13}n^2}{(1+n^2)^2}$$

(9)

where $$K_{13}=K_{11}K_{12}\left(\frac{R_{9-13}}{R_{9-13}+R_{9-17}}\right)$$

The subscript for R in each instance denotes the correspondingly designated resistor in Fig. 9. Thus, $R_{9-13}$ is the resistance value of resistor 9-13.

When feedback resistor 9-16 is connected from the cathode of 9-12 to the input circuit of 9-05, the ratio $E_{14}/E_{11}$ is no longer given by Equation 9, but is given as $$\frac{E_{14}}{E_{11}}=\frac{K_{13}\left(\frac{n}{1+n^2}\right)^2}{1+\beta_2 K_{13}\left(\frac{n}{1+n^2}\right)^2}$$

where $\beta_2$ is the feedback factor, whose magnitude is dependent on $R_{9-16}$. In this application, $\beta_2$ is adjusted (by adjusting resistor 9-16) so that $\beta_2 K_{13}=2.7$. Then $$\frac{E_{14}}{E_{11}}=\frac{K_{13}\left(\frac{n}{1+n^2}\right)^2}{1+2.7\left(\frac{n}{1+n^2}\right)^2}$$

Voltage $E_{14}$ is not all applied to the cathode circuit of triode 9-04, but is first reduced in the ratio $$\frac{R_{9-15}}{R_{9-15}+R_{9-14}}$$

If the feedback factor of amplifier triode 9-04 is $\beta_3$, then $$\beta_3=\frac{E_{14}}{E_{11}}\left(\frac{R_{9-15}}{R_{9-15}+R_{9-14}}\right)=$$

$$\frac{\left(\frac{R_{9-15}}{R_{9-15}+R_{9-14}}\right)K_{13}\left(\frac{n}{1+n^2}\right)^2}{1+2.7\left(\frac{n}{1+n^2}\right)^2}=\frac{K_{14}\left(\frac{n}{1+n^2}\right)^2}{1+2.7\left(\frac{n}{1+n^2}\right)^2}$$

where $$K_{14}=\left(\frac{R_{9-15}}{R_{9-15}+R_{9-14}}\right)K_{13}$$

If the gain of amplifier 9-04 without inverse feedback is $A_t$, then the gain with inverse feedback is $$A_4=\frac{A_t}{1+\beta_3 A_t}=\frac{A_t}{1+\dfrac{K_{14}\left(\dfrac{n}{1+n^2}\right)^2 A_t}{1+2.7\left(\dfrac{n}{1+n^2}\right)^2}}$$

If we adjust the value of $K_{14}A_t$ by adjusting $R_{9-15}$ so that $K_{14}A_t=23.97$, then $$A_4=\frac{A_t}{1+23.97\left[\frac{\left(\frac{n}{1+n^2}\right)^2}{1+2.7\left(\frac{n}{1+n^2}\right)^2}\right]} \quad (10)$$

Equation 10 shows how the gain of amplifier 9-04 varies with frequency when it is connected for inverse feedback in the manner indicated in Fig. 9. In order to find the overall gain from transformer 9-19 to the output circuit of amplifier 9-05, we must multiply the right-hand side of Equation 10 by the gain of the phase-shifter composed of triodes 9-01, 9-02, and 9-03 and their associated circuits. If the gain of this phase shifter is $A_p$, then by referring to Equation 3 we know that $$A_p=K_{15}\left(\frac{n}{1+n^2}\right) \quad (11)$$

where $K_{15}$ is a constant.

Let $A_a=$ overall gain from transformer 9-19 to the output circuits of amplifier 9-04. Then, $$A_a=A_pA_4=\frac{K_{16}\left(\frac{n}{1+n^2}\right)}{1+23.97\left[\frac{\left(\frac{n}{1+n^2}\right)^2}{1+2.7\left(\frac{n}{1+n^2}\right)^2}\right]}$$

$$=\frac{K_{16}\left(\frac{n}{1+n^2}\right)\left[1+2.7\left(\frac{n}{1+n^2}\right)^2\right]}{1+26.67\left(\frac{n}{1+n^2}\right)^2}$$

where $K_{16}$ is a constant.

In order to show how the overall gain varies with frequency, values of $A_a/K_{16}$ have been calculated for various frequencies, and have been recorded in the third column of Table II. The fourth column gives the same results expressed as percentages of the maximum value.

Let us suppose that the modulating voltage applied to balanced modulator 1-05 of Fig. 1 varies with frequency as indicated in the fourth column of Table II, while the voltage applied to balanced modulator 1-07 is independent of frequency, and is equal to 99.56% of the maximum applied to balanced modulator 1-05. The ratio of the amplitude of the desired sideband to the amplitude of the undesired sideband is then given by the expression:

$$\frac{A_a/K_{16}+99.56}{A_a/K_{16}-99.56}$$

where $A_a/K_{16}$ is given in per cent of maximum. This ratio has been calculated for various frequencies, and has been recorded in the fifth column of Table II. The corresponding decibel values are given in the sixth column. It can be seen that the minimum attenuation of the undesired sideband occurs at about 375 and 1500 cycles/sec., and is 52.89 decibels. This seems sufficient for preventing interference on the adjacent channel, even without the help of an output filter.

The circuits of Fig. 9 are more complicated than those of Fig. 7, but they give a greater degree of rejection of the undesired sideband, as can be seen by comparing the last column of Table II with the last column of Table I, which applies to the circuits of Fig. 7.

Table II

| Frequency, Cycles/Sec. | $n$ | $A_a/K_{16}$ | | Relative Sideband Amplitude | |
|---|---|---|---|---|---|
| | | Value | Percent of Max. Value | Numerical Ratio | Db |
| 187.5 | 1/4 | 0.10921 | 99.58 | 9,960 | 79.97 |
| 250 | 1/3 | 0.10967 | 100.00 | 454 | 53.14 |
| 300 | 2/5 | 0.10921 | 99.58 | 9,960 | 79.97 |
| 375 | 1/2 | 0.10875 | 99.11 | 441 | 52.89 |
| 500 | 2/3 | 0.10881 | 99.22 | 585 | 55.34 |
| 750 | 1 | 0.10923 | 99.69 | 1,535 | 63.75 |
| 1,125 | 3/2 | 0.10881 | 99.22 | 585 | 55.34 |
| 1,500 | 2 | 0.10875 | 99.11 | 441 | 52.89 |
| 1,875 | 5/2 | 0.10921 | 99.58 | 9,960 | 79.97 |
| 2,250 | 3 | 0.10967 | 100.00 | 454 | 53.14 |
| 3,000 | 4 | 0.10921 | 99.58 | 9,960 | 79.97 |

Table I shows that the lowest ratio of sideband suppression which is obtained in the 187.5–3000 cycles/sec. range is about 33 db. If the single-sideband generator is to be used in a carrier-current telephone system for the purpose of obtaining a maximum number of communication channels, this amount of rejection is hardly enough, as it will still allow a noticeable amount of interference on the adjacent channel.

One method of improving the operation would be to obtain the sideband rejection partly by balancing out the undesired sideband and partly by a filter that introduces about 18 db additional attenuation in the undesired sideband, thus bringing the total attenuation up to 51 db. Obviously, such a filter would not have to be as complicated or expensive as the filters ordinarily used in single-sideband communication. In some cases, sufficient additional sideband rejection might be obtained by using a pair of coupled resonant circuits in the input of the mixer-amplifier of Fig. 1, and another pair of such circuits in the output of this mixer-amplifier.

When single-sideband transmission is used for short-wave radiotelephony, the situation is considerably different, because the purpose of using single-sideband transmission in such applications is not necessarily that of increasing the number of communication channels available. In some cases, the principal purposes are to improve the signal-to-noise ratio obtainable with a given transmitter power, and to prevent certain types of distortion that result from multi-path transmission. For these purposes the amount of sideband rejection indicated in Table I might be entirely adequate, even if no filter of any kind were used for attenuating the undesired sideband.

The complete elimination of filters is quite advantageous, particularly in short-wave applications, because the design of filters having a sharp enough cutoff becomes increasingly difficult as the carrier frequency is increased; so that in short-wave applications employing filters it is usually necessary to use three modulator stages, each of which has to have a source of carrier voltage having a frequency different from that supplied to the other modulator stages; furthermore, each of the three modulator stages has to have an output filter, or other selective network, to eliminate the undesired sideband. Another disadvantage of single-sideband systems employing filters is that each filter has to be designed for a specific range of frequencies, and cannot be quickly and easily adapted to a different frequency range. The system shown in Fig. 1 can apparently be applied as readily to short-wave transmitters as to low-frequency transmitters, and does not require any more modulator stages, or other circuits, for short-wave applications than for low-frequency applications. The compensated phase-shifter circuits shown in Fig. 7, together with any other necessary audio-frequency circuits, can be assembled in a standardized unit which would be the same for all applications, regardless of the carrier frequency.

It is obvious that in the system shown in Fig. 1 a small amount of carrier energy could be introduced into the output of the mixer-amplifier and transmitted along with the sideband; and the amplitude of the carrier wave could be reinforced at the receiving station, as is sometimes done, so that there will not be any distortion caused by frequency drift such as might occur if an independent local oscillator were used.

Figure 10A:
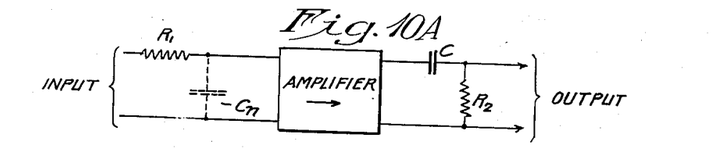
Figs. 10a, 10b, 10c and 10d are circuit diagrams illustrating a group of alternate networks each of which will produce a 90° phase shift throughout a range of frequencies.
Figure 10B:
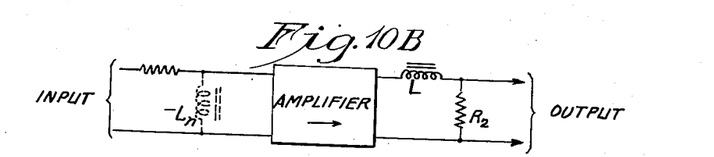
Figure 10C:
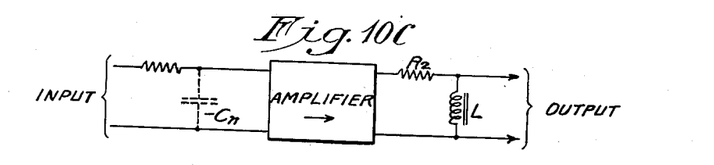

The network shown in Fig. 3 is not the only network that will produce a 90° phase shift at all frequencies. There are at least eight such networks, of which four are represented in the simplified diagrams of Fig. 10. In Fig. 10A we have the same network as shown in Fig. 3. In Fig. 10B, positive and negative inductance are used, instead of positive and negative capacitance. In Fig. 10C a negative capacitance and a positive inductance are used, and in Fig. 10D we also have a negative capacitance and a positive inductance, but in a different arrangement from that shown in Fig. 10C.

From the four networks shown in Figs. 10A to 10D it is possible to derive four additional networks for the same purpose, by interchanging the algebraic signs of the reactive elements in each network. For example, in Fig. 10A we would change $-C_n$ to a positive capacitance, while C would be changed to a negative capacitance. In any of the eight networks mentioned, it is necessary to choose the circuit constants so that the frequency at which a 45° phase shift occurs in the first resistance-reactance combination is the same as the frequency at which a 45° phase shift occurs in the second resistance-reactance combination.

Figure 10D:
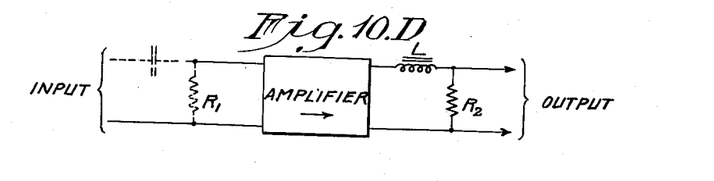

In the phase-shifter of Fig. 3, triodes 2-01, 2-02 and 2-03 are used not only for producing an equivalent negative capacitance 3-04, but also for amplifying the signal voltage before applying it to capacitor 3-03 and resistor 3-02. Instead of this, it is possible for the signal voltage across 3-04 to be applied to a separate amplifier, and the series output combination of capacitor 3-03 and resistor 3-02 can then be connected to the output of the separate amplifier instead of to the output of triode 2-03. In such an arrangement, the sole purpose of triodes 2-01, 2-02, and 2-03 would be to generate a negative capacitance. When triodes 2-01, 2-02 and 2-03 are used solely for generating a negative capacitance, it is possible to arrange this set of tubes, together with the signal source and the signal amplifier, in such a manner that the negative capacitance (or negative inductance) is introduced into the network as a series element, as shown in Fig. 10D, instead of as a shunt element as in Fig. 3.

In each of the four networks shown in Figs. 10A, 10B, 10C, and 10D, the first resistance-reactance combination is separated from the second by an amplifier. This amplifier is not essential, provided that the second resistance-reactance combination can be coupled loosely enough to the first combination so that it does not appreciably load the first combination.

In all of the 90-degree phase-shift networks discussed so far, the phase shift is accomplished in two steps: The signal is first shifted in phase by one resistance-reactance combination, and is later shifted in phase by another resistance-reactance combination, and the total phase shift is 90 degrees.

Figure 11:
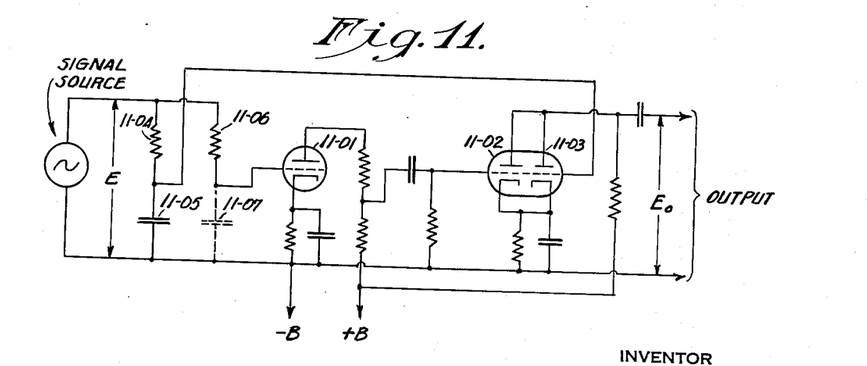
Fig. 11 is a circuit diagram of another form of phase shifting network.

Fig. 11 shows a 90-degree phase shifter which differs from the preceding phase shifters in that the two resistance-reactance combinations are connected in parallel. The voltage across capacitor 11-05 is applied between the grid and cathode of triode 11-03, and the voltage across equivalent negative capacitance 11-07 is passed through phase inverter 11-01 and then applied between the grid and cathode of triode 11-02. The resultant output voltage of triode 11-02 and triode 11-03, whose plates are connected in multiple, is proportional to the difference between the voltage across capacitor 11-05 and the voltage across equivalent negative capacitance 11-07.

Figures 12A, 12B, 13:
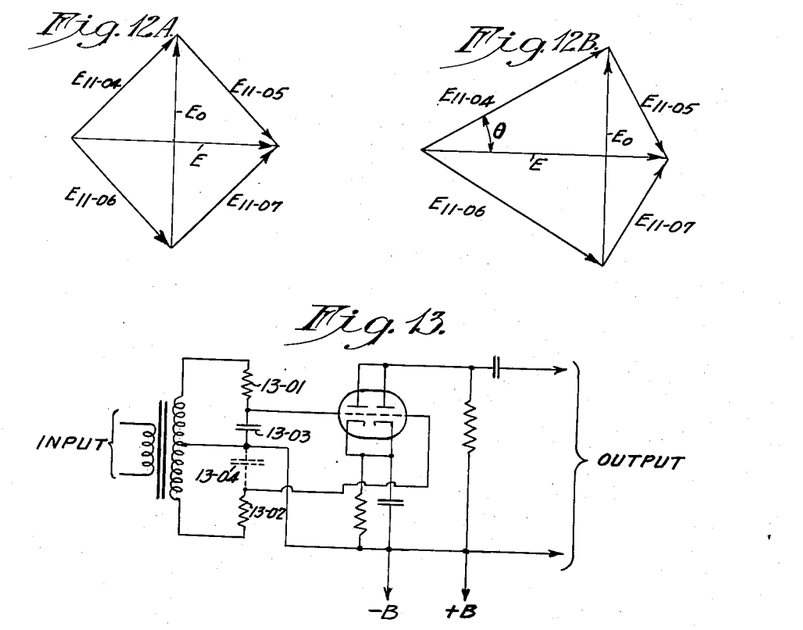
Figs. 12a and 12b are vector diagrams of certain voltages of Fig. 11 used to produce a phase shift.
Fig. 13 is a circuit diagram showing a simplified form of phase shifter.

Fig. 12A is a vector diagram which shows the phase relations existing in the circuit of Fig. 11 at a frequency of 750 cycles/sec. assuming that the circuit constants have been so chosen that at this frequency the absolute magnitudes of the voltage drops across the four circuit elements 11-04, 11-05, 11-06 and 11-07 are all equal. The output voltage is proportional to vector $E_0$. When the frequency is increased to some value $f$, then $$\frac{E_{11-05}}{E_{11-04}} = \frac{750}{f}$$

and $$\frac{E_{11-07}}{E_{11-06}} = \frac{750}{f}$$

as shown in Fig. 12B. Now, $$\frac{E_0}{2} \bigg/ E_{11-04} = \sin \theta$$

and $$\frac{E}{E_{11-04}} = \frac{1}{\cos \theta}$$

Then, $$\frac{E_0}{E} = \frac{2 E_{11-04} \sin \theta}{E_{11-04}/\cos \theta} = 2 \sin \theta \cos \theta =$$

$$2 \frac{\tan \theta}{\sqrt{1+\tan^2 \theta}} \cdot \frac{1}{\sqrt{1+\tan^2 \theta}} = \frac{2 \tan \theta}{1+\tan^2 \theta}$$

But $$\tan \theta = \frac{E_{11-05}}{E_{11-04}} = \frac{750}{f}$$

Then, $$\frac{E_0}{E} = 2 \frac{\frac{750}{f}}{1+\left(\frac{750}{f}\right)^2}$$

By comparing the above equation with Equation 3 above, it can be seen that the variation of amplitude with frequency is the same for the phase shifter of Fig. 11 as for the phase shifter shown in Fig. 3.

Instead of using positive and negative capacitances in Fig. 11, it would have been possible to use positive and negative inductances; furthermore, the positions of the resistances and capacitances could have been interchanged, so that the resistances would be on the ground side of the circuit.

Fig. 13 shows a phase shifter in which the voltages applied to the two resistance-reactance combinations are 180 degrees out of phase. This arrangement makes it unnecessary to use the phase inverter triode 11-01 shown in Fig. 11.

In Figs. 11 and 13 the method of obtaining the negative capacitance was not shown, but circuits such as that of Fig. 2 could be used for this purpose.

Either of these phase shifters may be used instead of the phase shifter of Fig. 3, with the same type of amplitude compensation.

A question that naturally arises in connection with the circuits shown in Figs. 7 and 9 is whether they will get out of adjustment too easily, due to changes in amplification caused by variations in tube characteristics. In this connection it should be pointed out that all of the amplifiers in Figs. 7 and 9 have inverse feedback in some form, and it is well known that if enough inverse feedback is used, the gain of an amplifier can be made largely independent of the tube characteristics, and it will depend almost entirely on the constants of the feedback network. If the feedback network is made up of resistors and capacitors, the stability of the amplifier gain is comparable to the stability of these resistors and capacitors.

Figure 14:
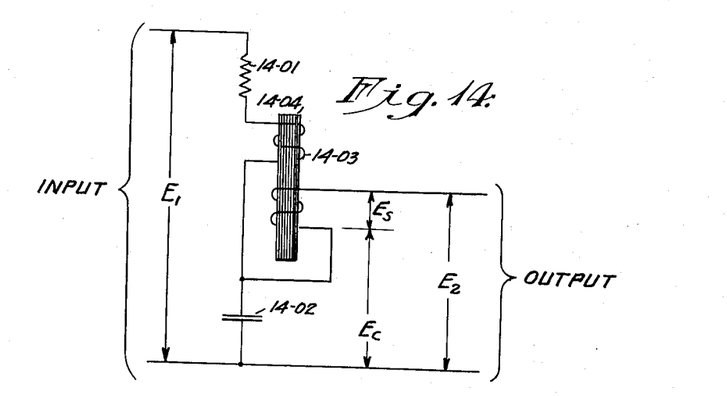
Fig. 14 is a circuit diagram illustrating an inductively coupled basic network for producing phase shift.

Fig. 14 shows a basic network for producing a 90° phase shift. This network is shown by M. A. Honnell in the article published in November, 1945 Electronics.

If resistor 14-01 is made very large compared with the reactances of capacitor 14-02 and transformer 14-04 (e. g., 100 times as large or larger), the output voltage $E_2$ will be very nearly 90 degrees out of phase with the input voltage $E_1$. The current through resistor 14-01, capacitor 14-02, and the primary winding 14-03 of transformer 14-04 will remain substantially constant over a wide range of frequencies (because the total impedance of the circuit is governed primarily by the value of resistor 14-01 which is large), so that the magnitude of voltage $E_s$ may be considered to be directly proportional to the frequency, while the magnitude of voltage $E_c$ is inversely proportional to the frequency. The secondary winding of transformer 14-04 is connected with such polarity that the voltage $E_s$ is added in phase to the voltage $E_c$.

Let us suppose that the circuit constants have been chosen so that at a frequency of 750 cycles/sec. $E_2$ has some value $E_0$, and $E_s = E_c = E_0/2$. Then, if the frequency is changed to some other value $f$, the new value of $E_2$ is given by the expression, $$E_2 = \frac{E_0}{2}n + \frac{E_0}{2}\left(\frac{1}{n}\right) = \frac{E_0}{2}\left(\frac{1+n^2}{n}\right) \quad (12)$$

where $n = f/750$.

It is obvious that the magnitude of $E_2$ will vary greatly if the frequency is varied over the range from 200-3000 cycles/sec.

By comparing Equation 12 with my Equation 3, one can compare the amplitude variation occurring in the network of my Fig. 14 with the amplitude variation occurring in the network of my Fig. 3. It can be seen that the amplitude obtained in one case is proportional to the reciprocal of that obtained in the other case.

Figure 15:
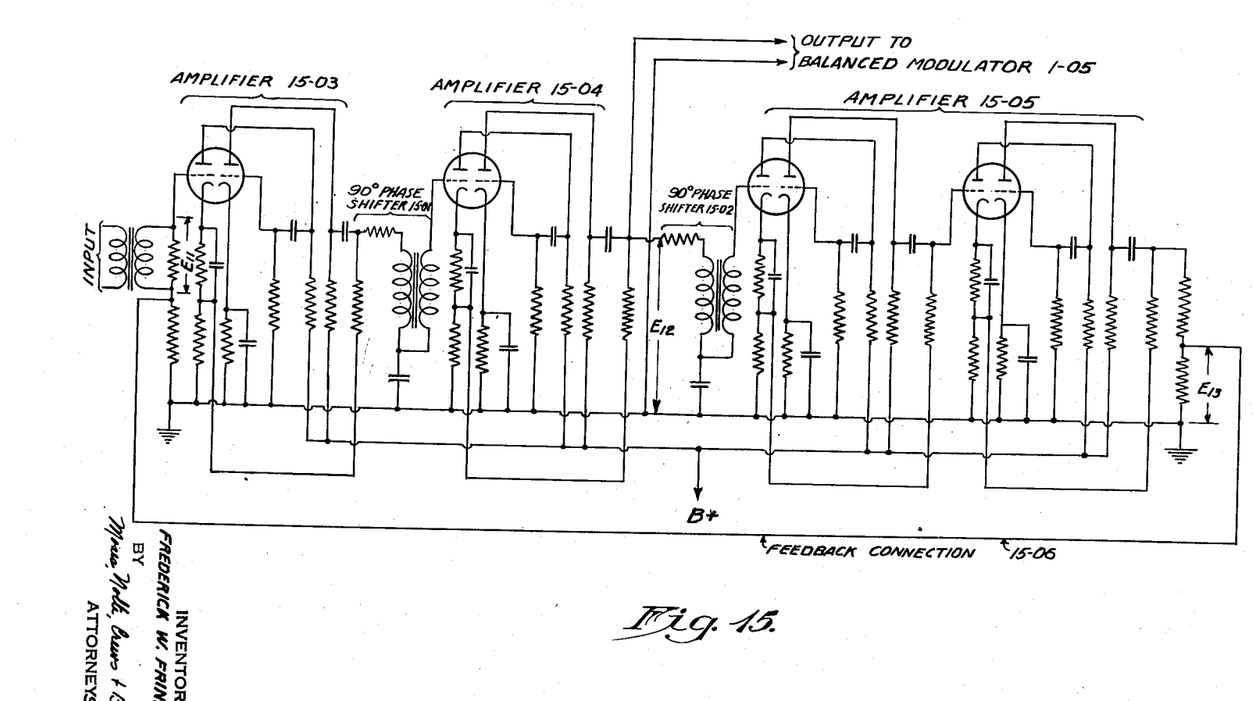
Fig. 15 is a circuit diagram showing a compensated 90° phase shifter using the basic network of Fig. 14.

The variation in amplitude can be greatly reduced by elaborating on the circuit shown in my Fig. 14, and one method of producing such compensation is shown in my Fig. 15.

This comprises two basic phase shifting networks 15-01 and 15-02 and three associated two-stage amplifiers 15-03, 15-04 and 15-05. Principally, the phase shift produced by network 15-01 is utilized, the other network 15-02 forming a part of the amplitude-frequency compensation circuit. Inverse feed-back is provided via conductor 15-06.

If the feedback connection 15-06 shown in Fig. 15 is not used, we may, in accordance with Equation 12, write, $$\frac{E_{12}}{E_{11}} = K_1\left(\frac{1+n^2}{n}\right) \quad (13)$$

where $K_1$ is a constant;

$$\frac{E_{13}}{E_{12}} = K_2\left(\frac{1+n^2}{n}\right) \quad (14)$$

also, where $K_2$ is another constant; then, $$\frac{E_{13}}{E_{11}} = \frac{E_{12}}{E_{11}} \cdot \frac{E_{13}}{E_{12}} = K_1 K_2 \left(\frac{1+n^2}{n}\right)^2 \quad (15)$$

If the feedback connection 15-06 is used, $$\frac{E_{13}}{E_{12}} = \frac{K_1 K_2 \left(\frac{1+n^2}{n}\right)^2}{1 + K_1 K_2 \left(\frac{1+n^2}{n}\right)^2} \quad (16)$$

To find $E_{12}/E_{11}$ under this condition, we must divide Equation 16 by Equation 14; i. e., $$\frac{E_{12}}{E_{11}} = \frac{E_{13}/E_{11}}{E_{13}/E_{12}} = \frac{K_1 K_2 \left(\frac{1+n^2}{n}\right)^2}{1 + K_1 K_2 \left(\frac{1+n^2}{n}\right)^2} \cdot \frac{1}{K_2\left(\frac{1+n^2}{n}\right)} =$$

$$\frac{K_1\left(\frac{1+n^2}{n}\right)}{1 + K_1 K_2 \left(\frac{1+n^2}{n}\right)^2} \quad (17)$$

Assume that the amount of amplification is adjusted so that $K_1 K_2 = 1/7.8$. Then, $$\frac{E_{12}}{E_{11}} = \frac{K_1\left(\frac{1+n^2}{n}\right)}{1 + \frac{1}{7.8}\left(\frac{1+n^2}{n}\right)^2} \quad (18)$$

If we multiply both numerator and denominator of this expression by $$\left(\frac{n}{1+n^2}\right)^2$$

we obtain, $$\frac{E_{12}}{E_{11}} = \frac{K_1\left(\frac{n}{1+n^2}\right)}{\left(\frac{n}{1+n^2}\right)^2 + \frac{1}{7.8}} = \frac{7.8 K_1\left(\frac{n}{1+n^2}\right)}{1 + 7.8\left(\frac{n}{1+n^2}\right)^2} \quad (19)$$

Equation 19 has the same form as Equation 8, which applies to the network shown in my Fig. 7. Evidently, the output amplitude variation with respect to frequency is the same for the circuits of Fig. 15 as for the circuits of Fig. 7. This variation has been shown in Table I and Fig. 8.

Since there is a rather large loss of audio-frequency voltage in the phase shifters of Fig. 15, due to the necessary use of large series resistors, a large amount of amplification is required to make up for this loss. Moreover, each of the three amplifiers shown in Fig. 15 should have a considerable amount of inverse feedback, to stabilize the gain.

Figure 16:
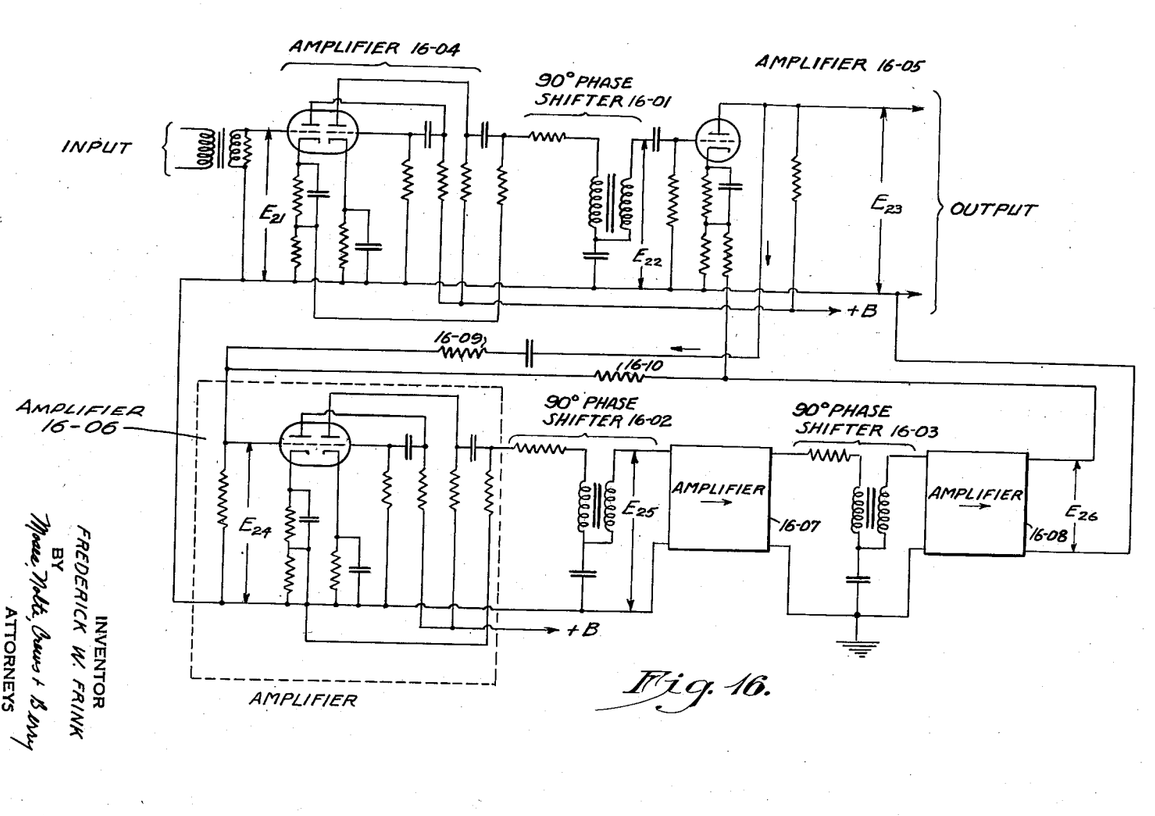
Fig. 16 is a circuit diagram which shows a more elaborate form of compensated phase shifter likewise using the basic network of Fig. 14.

An alternative method of compensating for amplitude variation is shown in Fig. 16. In Fig. 16 the phase shift is principally produced by basic network 16-01 and its associated input amplifier 16-04, the remainder of the system providing compensation for amplitude variation. Amplifiers 16-07 and 16-08 are identical with amplifier 16-06 which is shown in detail. The ratio of $E_{22}$ to $E_{21}$ in passing through amplifier 16-01 can be found by referring to Equation 12:

$$\frac{E_{22}}{E_{21}}=K_{21}\left(\frac{1+n^2}{n}\right) \quad (20)$$

where $K_{21}$ is a constant.

Amplifier 16-05 is used to compensate for the amplitude variation produced by phase shifter 16-01. Amplifier 16-05 has a feedback system consisting of amplifiers 16-06, 16-07, and 16-08, and phase shifters 16-02 and 16-03. This feedback system receives voltage from the plate circuit of amplifier 16-05, through resistor 16-09, and delivers voltage to the cathode circuit of amplifier 16-05. The overall phase shift in this feedback system is 180 degrees, due to phase shifters 16-02 and 16-03. There is a feedback connection 16-10, from the output of 16-08 to the input of 16-06.

From Equation 12, we know that $$\frac{E_{25}}{E_{24}}=K_{22}\left(\frac{1+n^2}{n}\right) \quad (21)$$

and $$\frac{E_{26}}{E_{25}}=K_{23}\left(\frac{1+n^2}{n}\right) \quad (22)$$

where $K_{22}$ and $K_{23}$ are constants. If feedback connection 16-10 is omitted, $$\frac{E_{26}}{E_{24}}=\frac{E_{25}}{E_{24}}\cdot\frac{E_{26}}{E_{25}}=K_{22}K_{23}\left(\frac{1+n^2}{n}\right)^2 \quad (23)$$

If feedback connection 16-10 is used, $$\frac{E_{26}}{E_{24}}=\frac{K_{22}K_{23}\left(\frac{1+n^2}{n}\right)^2}{1+K_{24}K_{22}K_{23}\left(\frac{1+n^2}{n}\right)^2}$$

where $K_{24}$ is a constant which depends on the amount of feedback coupling between amplifiers 16-08 and 16-06. Let us assume that the circuits are so adjusted that the product $$K_{24}K_{22}K_{23}=9$$

Then, $$\frac{E_{26}}{E_{24}}=\frac{K_{22}K_{23}\left(\frac{1+n^2}{n}\right)^2}{1+9\left(\frac{1+n^2}{n}\right)^2} \quad (24)$$

Let us suppose that the gain of amplifier 16-05 without feedback is $K_{25}$. Then, the gain obtained when the feedback system comprising 16-06, 16-02, 16-07, 16-03, and 16-08, is used, is given as $$\frac{E_{23}}{E_{22}}=\frac{K_{25}}{1+K_{26}\left(\frac{E_{26}}{E_{24}}\right)K_{25}} \quad (25)$$

where $K_{26}$ is a constant that depends on the magnitude of resistor 16-09. Substituting the value of $E_{26}/E_{24}$ obtained from Equation 24 in Equation 25, we obtain, $$\frac{E_{23}}{E_{22}}=\frac{K_{25}}{1+K_{26}\left[\frac{K_{22}K_{23}\left(\frac{1+n^2}{n}\right)^2}{1+9\left(\frac{1+n^2}{n}\right)^2}\right]K_{25}}$$

Assume that $K_{26}$ is adjusted, by adjusting resistor 16-09 so that the product $K_{26}K_{22}K_{23}K_{25}=8$.

Then, $$\frac{E_{23}}{E_{22}}=\frac{K_{25}}{1+8\left[\frac{\left(\frac{1+n^2}{n}\right)^2}{1+9\left(\frac{1+n^2}{n}\right)^2}\right]} \quad (26)$$

To obtain the overall gain, $E_{23}/E_{21}$, we must multiply $E_{22}/E_{21}$, as obtained from Equation 20, by $E_{23}/E_{22}$, as obtained from Equation 26; i. e., $$\frac{E_{23}}{E_{21}}=\frac{E_{22}}{E_{21}}\cdot\frac{E_{23}}{E_{22}}=\frac{K_{21}\left(\frac{1+n^2}{n}\right)K_{25}}{1+8\left[\frac{\left(\frac{1+n^2}{n}\right)^2}{1+9\left(\frac{1+n^2}{n}\right)^2}\right]} \quad (27)$$

Table III shows calculated values of $E_{23}/E_{21}$, expressed as per cent of maximum, for various frequencies. It can be seen that the use of amplifier 16-05, together with its feedback system, greatly reduces the variation in output amplitude with frequency.

Table III

| Frequency (cycles/sec.) | $n$ | Amplitude (percent of maximum) |
|---|---|---|
| 187.5 | 1/4 | 100.0 |
| 250 | 1/3 | 94.3 |
| 300 | 2/5 | 93.7 |
| 375 | 1/2 | 94.7 |
| 500 | 2/3 | 97.6 |
| 750 | 1 | 99.9 |
| 1,125 | 3/2 | 97.6 |
| 1,500 | 2 | 94.7 |
| 1,875 | 5/2 | 93.7 |
| 2,250 | 3 | 94.3 |
| 3,000 | 4 | 100.0 |

I have described what I believe to be the best embodiments of my invention. I do not wish, however, to be confined to the embodiments shown, but what I desire to cover by Letters Patent is set forth in the appended claims.

I claim:

1. In a network for producing a predetermined substantially constant angle of phase shift throughout a range of frequencies and having input and output connections, in combination, angle producing means connected intermediate said input and output connections for producing the predetermined angle of phase shift but which incidentally introduces distortion, amplifying means connected intermediate said input and output connections and in cascade relationship with respect to said angle producing means and including a negative feed back path, and compensating means included in said feed back path and disposed to compensate throughout said range of frequencies for the distortion produced by said angle producing means without appreciably affecting the magnitude of the angle produced.

2. A network as in claim 1 in which the angle producing means includes a reversed reactance.

3. A network as in claim 1 in which the angle producing means includes a transformer connected to produce at least a part of the angle.

4. A network as in claim 3 in which the transformer comprises first and second windings each winding having two terminals, the first winding being serially included in a series circuit comprising a resistor and a capacitor, one of its terminals being connected to the capacitor, the resistor being of relatively large resistance for maintaining the impedance of the series circuit relatively constant throughout said range of frequencies, and the second winding having one of its terminals connected to said terminal of the first winding and to the capacitor, the other terminal of the second winding providing a connection from which the produced angle may be derived.

5. A network as in claim 1 in which the angle producing means consists of phase shifting means.

6. A network as in claim 1 in which the compensating means comprises further angle producing means.

7. A network as in claim 6 in which the further angle producing means is substantially identical with the first-named angle producing means.

8. A network according to claim 1 in which the compensating means comprises a further network, said further network, except for the feedback path thereof, being substantially the same in all respects as the first-named network.

9. In a network for producing a substantially constant 90° phase shift in a voltage of varying frequency, an amplifier, a capacitor coupling an output terminal of the amplifier to an input terminal of the same relative instantaneous polarity, a resistor connected in series with the input of said amplifier and having a resistance substantially equal to the reactance of said amplifier input at a pre-selected mean frequency, and an output network comprising a resistance and capacitance in series, said resistance and capacitance values being such that the angle of phase shift produced at the output of the amplifier will be the complement of the angle of the phase shift produced at the input of the amplifier regardless of the frequency being amplified.

10. In a network for producing a substantially constant 90° phase shift in a voltage of varying frequency, an amplifier, a capacitor coupling an output terminal of the amplifier to an input terminal of the same relative instantaneous polarity, a resistor connected in series with the input of said amplifier and having a resistance substantially equal to the reactance of said amplifier input at a preselected mean frequency, and an output network comprising a resistance and capacitance in series, said resistance and capacitance values being such that the angle of phase shift produced at the output of the amplifier will be the complement of the angle of the phase shift produced at the input of the amplifier regardless of the frequency being amplified, and a voltage compensating network designed to restore to their original relative intensities the various frequency components of the input voltage without appreciably affecting the two complementary angles of phase shift introduced by the capacitor, resistor and output network.

11. In a ninety-degree phase shifting network for producing a substantially constant phase shift throughout a range of frequencies and having input and output terminals; an amplifier; a reactive circuit element coupling an output terminal of the amplifier to an input terminal thereof of the same relative instantaneous polarity; a resistor connected in series with the input of said amplifier and having a resistance substantially equal to the reactance of said amplifier input at a preselected mean frequency; and a reactive network comprising a resistance and a reactive circuit element, said resistance and reactance values being such that the angle of phase shift produced thereby will be the complement of the angle of phase shift produced by the combination of the amplifier, the first-named reactive circuit element and the first-named resistor; and circuit means interconnecting the reactive network and the last-named combination in cascaded relationship intermediate the input and output terminals of the ninety-degree phase shifting network.

12. A ninety-degree phase shifting network as in claim 11 further comprising a voltage compensating network interposed between the input and output terminals thereof, the characteristics of said compensating network being such as to restore substantially to their original relative intensities at the output terminals, the various frequency components of a voltage of varying frequency applied to the input terminals, without materially affecting the magnitude of the ninety-degree phase shift.

13. In a system for producing a substantially constant ninety-degree phase shift at all frequencies in a particular range, a network comprising an amplifier, a reactance element connecting an output terminal of said amplifier to an input terminal of the same relative instantaneous polarity, and a resistor connected in series with the input of said amplifier and having a resistance substantially equal to the reactance of said amplifier at a pre-selected frequency in said range, and another network connected in cascade with the first mentioned network and consisting of a resistance and a reactance in series, the values of said resistance and reactance being such that the angle of phase shift produced by said other network is the complement of the angle of phase shift produced by the first mentioned network.

14. In a system for producing a substantially constant ninety-degree phase shift at all frequencies in particular range, a network comprising an amplifier, a reactance element connecting an output terminal of said amplifier to an input terminal of the same relative instantaneous polarity, and a resistor connected in series with the input of said amplifier and having a resistance substantially equal to the reactance of said amplifier at a pre-selected frequency in said range, another network connected in cascade with the first mentioned network and consisting of a resistance and a reactance in series, the values of said resistance and reactance being such that the angle of phase shift produced by said other network is the complement of the angle of phase shift produced by the first mentioned network, and a voltage compensating network designed to restore to their original relative amplitudes the various frequency components of the input voltage of said system without appreciably affecting the resultant angle of phase shift produced by the first mentioned network and said other network.

15. In a system for producing a substantially constant ninety-degree phase shift at all frequencies in a particular range, a network comprising an amplifier, a reactance element connecting an output terminal of said amplifier to an input terminal of the same relative instantaneous polarity; and a resistor connected in series with the input of said amplifier and having a resistance substantially equal to the reactance of said amplifier at a pre-selected frequency in said range, another network consisting of a resistance and a reactance in series; and means for combining the transmission characteristics of both of said networks to obtain a resultant ninety-degree phase shift at all frequencies in said range.

16. In a system for producing a substantially constant ninety-degree phase shift at all frequencies in a particular range, a network comprising an amplifier, a reactance element connecting an output terminal of said amplifier to an input terminal of the same relative instantaneous polarity, and a resistor connected in series with the input of said amplifier and having a resistance substantially equal to the reactance of said amplifier at a pre-selected frequency in said range, another network consisting of a resistance and a reactance in series, means for combining the transmission characteristics of both of said networks to obtain a resultant ninety-degree phase shift at all frequencies in said range, and a voltage compensating network designed to restore to their original relative amplitudes the various frequency components of the input voltage of said system without appreciably affecting the resultant angle of phase shift produced by the first mentioned network and said other network.

17. In a phase shifting device, in combination: a first network comprising a resistance and a reversed reactance in series; a second network comprising a resistance and a conventional reactance in series, the angle of phase shift produced by the second network being substantially the complement of the angle of phase shift produced by the first network throughout a wide range of frequencies, and circuit means interconnecting the two networks for combining the transmission characteristics thereof to obtain a resultant ninety-degree phase shift throughout said frequency range.

18. A phase shifting device as in claim 17, further comprising a voltage compensating network interconnected with the first and second networks and with the circuit means, the transmission characteristics of said compensating network being such as to restore toward their original relative intensities the various frequency components of a voltage of varying frequency whose phase has been shifted through an angle of ninety degrees by said device without appreciably affecting said ninety degree angle.

19. In a phase shifting device, in combination: a first phase shifting network providing a substantially constant ninety-degree angle of phase shift throughout a wide range of frequencies; a feedback path connecting the output of said network to the input thereof; and a second phase shifting network having transmission characteristics similar to those of the first network included in said feedback path for restoring toward their original relative intensities the various frequency components of a voltage of varying frequency whose phase has been shifted by said device without appreciably affecting said ninety degree angle.

20. In a phase shifting device, in combination: a first phase shifting network providing a substantially constant angle of phase shift throughout a range of frequencies; a feedback path connecting the output of said network to the input thereof; and a second phase shifting network included in said feedback path and having a substantially constant angle of phase shift which is the supplement of the first-named angle throughout said range of frequencies.

21. In a phase shifting device; a feedback loop comprising an amplifier and two ninety-degree phase shifters, one of said phase shifters providing equalization for the transmission characteristics of the other; a first circuit means for applying a signal to said feedback loop; and a second circuit means for deriving a signal therefrom, the transmission path between said first and second circuit means including the one of said phase shifters whose transmission characteristics are equalized and excluding the phase shifter which provides said equalization.

22. In a network for producing a substantially constant 90° phase shift in a voltage of varying frequency; a series combination of a resistor and a conventional reactance connected to be energized by the voltage of varying frequency; a series combination of a resistor and a reversed reactance of character like the first-named reactance connected to be energized by the voltage of varying frequency in multiple with the first named combination; means for inverting the phase relationship at the junction between one of the reactances and one of the resistors; and means for combining the voltage appearing at the junction between the other reactance and the other resistor with the output of the phase inverting means whereby a voltage will be derived whose phase will be shifted by a substantially constant angle of 90° throughout the range of variation of said varying frequency.

23. A network as in claim 22 wherein the character of the two reactances is inductive.

24. A network as in claim 22 wherein the character of the two reactances is capacitative.

25. In a network for producing a substantially constant 90° phase shift in a voltage of varying frequency; the series combination of a resistor, a conventional reactance, a reversed reactance of character like the first-named reactance, and a second resistor, in the order named, arranged to be energized by the voltage of varying frequency; a first output terminal connected to the junction between the two reactances; means for combining the voltage drops across the two reactances in like phase relationship; and a second output terminal connected to the combining means for deriving the combined voltage drops therefrom, whereby the voltage appearing across the two output terminals will be shifted in phase by a substantially constant angle of 90° throughout the range of variation of said varying frequency.

26. A network as in claim 25 in which the character of the two reactances is inductive.

27. A network as in claim 25 in which the character of the two reactances is capacitative.

28. In a phase shifting network for producing a substantially constant phase shift of ninety degrees throughout a range of frequencies; a first series combination of a resistor and a conventional reactance; a second series combination of a resistor and a reversed reactance, and circuit means connected to the two series combinations and combining the phase shifts produced by the two reactances to provide a total phase shift of ninety degrees, the magnitude of said phase shift remaining substantially constant throughout said range of frequencies.

29. A network of the class described, comprising; input and output connections for said network and a transmission path extending therebetween; a first phase shifting means included in said transmission path, said phase shifting means producing a substantially constant predetermined angle of phase shift throughout a range of frequencies, and incidentally changing the relative magnitudes of the different frequency components of a complex wave at different frequencies within said range, thereby producing distortion; a feed back path extending from a first point on said transmission path where said phase shift and distortion are present to a second point on said transmission path between said network input connection and said first point; and compensating means included in said feed back path and comprising a second phase shifting means for producing a total angle of phase shift of substantially 180 degrees throughout said range of frequencies in a loop including said feed back path and that portion of said transmission path extending between said first and second points, the circuit parameters of said compensating means being dimensioned to have transmission characteristics producing distortion similar to and at least partially compensating for that produced by said first phase shifting means.

30. A network according to claim 29 in which said substantially constant angle of phase shift is 90 degrees and wherein said first phase shifting means comprises a transformer having at least one winding, a resistor connected to one end of said winding and a capacitor connected to another point on said winding, the resistance value of said resistor being sufficient to maintain the impedance of a circuit including said transformer winding, resistor and capacitor substantially constant throughout said range of frequencies.

31. A network according to claim 29, wherein said substantially constant angle of phase shift is 90 degrees, and in which said first phase shifting means includes a series circuit having connected therein a resistor whose resistance is sufficiently large to render the impedance of the circuit substantially constant throughout said range of frequencies, a transformer and a capacitor, and means included in said transmission path and operatively associated with said transformer for deriving therefrom a voltage whose phase is shifted by substantially 90 degrees from the phase of the voltage applied to said series circuit, said series circuit being connected to said transmission path to receive said applied voltage therefrom.

32. A network according to claim 31, in which said transmission path has a negative feed back amplifier included therein, said feed back path of said network including said feed back path of said amplifier.

33. A network according to claim 31, wherein said second phase shifting network comprises at least one series circuit similar to said first-named series circuit, said voltage deriving means being included in said feed back path, and said last-named series circuit being connected in said feed back path to receive said applied voltage therefrom.

FREDERICK W. FRINK.

References Cited in the file of this patent

UNITED STATES PATENTS

| Number | Name | Date |
|---|---|---|
| 1,915,440 | Nyquist | June 27, 1933 |
| 2,020,327 | Purington | Nov. 12, 1935 |
| 2,174,166 | Plebanski | Sept. 26, 1939 |
| 2,248,045 | Dow | July 8, 1941 |
| 2,248,132 | Smith | July 8, 1941 |
| 2,341,322 | Norton | Feb. 8, 1944 |
| 2,369,066 | Maxwell | Feb. 6, 1945 |
| 2,392,476 | Hodgson | Jan. 8, 1946 |
| 2,412,995 | Levy | Dec. 24, 1946 |
| 2,468,302 | Meacham | Apr. 26, 1949 |